(12) United States Patent
Gorecki et al.

(10) Patent No.: US 7,158,575 B2
(45) Date of Patent: Jan. 2, 2007

(54) SYSTEM AND METHOD FOR EMBEDDING A SUB-CHANNEL IN A BLOCK CODED DATA STREAM

(75) Inventors: James Gorecki, Hillsboro, OR (US); John T. Stonick, Portland, OR (US); Shawn Searles, Beaverton, OR (US); William S. Check, Jr., Beaverton, OR (US); Robert B. Lefferts, Portland, OR (US)

(73) Assignee: Synopsys, Inc., Mountain View, CA (US)

( * ) Notice: Subject to any disclaimer, the term of this patent is extended or adjusted under 35 U.S.C. 154(b) by 763 days.

(21) Appl. No.: 10/222,071

(22) Filed: Aug. 16, 2002

(65) Prior Publication Data

US 2003/0108118 A1 Jun. 12, 2003

Related U.S. Application Data (60) Provisional application No. 60/313,456, filed on Aug. 20, 2001, provisional application No. 60/313,214, filed on Aug. 17, 2001.

(51) Int. Cl.
*H04L 27/00* (2006.01)
*H04B 1/38* (2006.01)

(52) U.S. Cl. ...................... 375/259; 375/222

(58) Field of Classification Search ............... 375/222, 375/259, 295, 316
See application file for complete search history.

(56) References Cited

U.S. PATENT DOCUMENTS

| | | | |
|---|---|---|---|
| 5,872,904 A | * | 2/1999 | McMillen et al. ............. 714/4 |
| 6,246,716 B1 | | 6/2001 | Schneider |
| 6,259,680 B1 | | 7/2001 | Blackwell et al. |

* cited by examiner

*Primary Examiner*—Jay K. Patel
*Assistant Examiner*—David B. Lugo
(74) *Attorney, Agent, or Firm*—Jonathan T. Kaplan (57) ABSTRACT

The present invention relates in general to a method, apparatus, and article of manufacture for providing high-speed digital communications through a communications channel. In one aspect, the present invention employs a variable rate back channel, incorporated within an existing communication that does not increase or adversely impact the transmission rate of data on the communication channel.

18 Claims, 4 Drawing Sheets

SYSTEM AND METHOD FOR EMBEDDING A SUB-CHANNEL IN A BLOCK CODED DATA STREAM

CROSS-REFERENCE TO RELATED APPLICATIONS

This application claims priority to U.S. Provisional Patent Application Ser. No. 60/313,456, entitled "Variable Rate Sub-Channel Using Block Code RDS", filed Aug. 20, 2001, and U.S. Provisional Application Ser. No. 60/313,214, entitled "Transceiver Apparatus and Method", filed Aug. 17, 2001. The contents of these provisional applications are incorporated, in their entirety, by reference herein.

This application is related to U.S. Provisional Patent Application Ser. No. 60/313,454, entitled "Transceiver System for High Speed Digital Signaling", filed Aug. 20, 2001; U.S. Provisional Patent Application Ser. No. 60/313,455, entitled "Automatic Slicer Level Adaption", filed Aug. 20, 2001; U.S. Provisional Patent Application Ser. No. 60/313,478, entitled "Variable Delay FIR Equalizer for Ser. Baseband Communications", filed August 20, 2001; U.S. Provisional Patent Application Ser. No. 60/313,477, entitled "Crosstalk Management for High-Speed Signaling Links", filed Aug. 20, 2001; and U.S. Provisional Patent Application Ser. No. 60/313,476, entitled "Method and Apparatus for Encoding and Decoding Digital Communications Data", filed Aug. 20, 2001. All of these provisional applications are hereby incorporated herein by reference.

This application is also related to non-provisional patent applications that claim priority to one or more of the above-referenced provisional patent applications. These non-provisional patent applications are entitled "System and Method for High Speed Digital Signaling", filed Aug. 16, 2002 with U.S. patent application Ser. No. 10/222,122; entitled "System and Method for Slicer Level Adaption", filed Aug. 16, 2002 with U.S. patent application Ser. No. 10/222.073; "System and Method for Providing Variable Delay FIR Equalizer for Serial Baseband Communications", filed Aug. 16, 2002 with U.S. patent application Ser. No. 10/222.166; "System and Method for Providing Crosstalk Management for High-Speed Signaling Links", filed Aug. 16, 2002 with U.S. patent application Ser. No. 10/222.072; and "Method and Apparatus for Encoding and Decoding Digital Communications Data", filed Aug. 16, 2002 with U.S. patent application Ser. No. 10/222.254. The aforementioned non-provisional patent applications are hereby incorporated by reference, in their entirety, herein.

BACKGROUND OF THE INVENTION

This application relates in general to a method, apparatus, and article of manufacture for providing high-speed digital communications through a communications channel, and more particularly to a method, apparatus, and article of manufacture for providing a system and method for embedding a sub-channel in a block coded data stream.

Digital communications systems are continuously increasing the transfer rate at which data is transmitted between devices through a communications channel, for example, a backplane. One technique for increasing the data transfer rate is to encode the data prior to transmission. In this regard, there are a number of techniques for encoding data. Many of these techniques utilize different numbers of signals and modulation of symbols in order to increase the data transfer rate. One such method of modulating symbols is to use a multi-level pulse amplitude modulation (PAM-n) scheme that encodes a plurality of bits of data into or onto a single signal in which the symbols are represented as a set of signal levels between minimum and maximum signal levels. An n-level pulse amplitude modulation technique may result in a transmitted symbol rate that is (log (2)/log (n)) of the actual data transmission rate.

In certain data communications systems, adaptive controls are employed to facilitate proper decoding of the received signal to thereby recover the digital representation of the data bits being transmitted. These adaptive controls adjust or modify various operating parameters of transmitters and receivers of the data communications system. These parameters may be best determined using the specific topography and operating characters of the communications channel. In addition, these parameters tend to change overtime and, as such, adaptively controlling the transmitters and receivers may enhance the operating performance of the communications system as that system changes over time.

When adaption is performed at the transmitter, there exists an inherent problem of communication. Any measure of performance can only be determined at the receiver, which is at the far end of the link. Therefore, information collected at the receiver must be returned back to the transmitter to adapt the output signal characteristics of the transmitter. The information sent from the receiver back to the transmitter to modify, change, optimize and/or enhance the output signal characteristics of the transmitter in accordance with the signal received by the receiver is termed a back channel.

SUMMARY OF THE INVENTION

The present invention relates in general to a method, apparatus, and article of manufacture for providing high speed digital communications through a communications channel, and more specifically to a system and method for providing a variable rate back channel (incorporated within an existing communication) without increasing or adversely impacting the transmission rate of data on the channel and/or without utilizing any or a significant portion of the bandwidth originally associated with that channel.

It should be noted that although the detailed description to follow describes the invention in the context of four-level pulse amplitude modulation (PAM-4), unless otherwise noted, the systems and techniques described are applicable to any and all modulation schemes including but not limited to PAM-4 encoding. Indeed, all forms of modulation, whether now known or later developed, are intended to be within the scope of the present invention.

BRIEF DESCRIPTION OF THE DRAWINGS

In the course of the detailed description to follow, reference will be made to the attached drawings. These drawings show different aspects of the present invention and, where appropriate, reference numerals illustrating like structures, components and/or elements in different figures are labeled similarly. It is understood that various combinations of the structures, components and/or elements other than those specifically shown are contemplated and within the scope of the present invention.

DETAILED DESCRIPTION

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the invention is defined only by the appended claims.

Throughout the specification and claims, the following terms take the meanings explicitly associated herein, unless the context clearly dictates otherwise. The term "connected" means a direct connection between the items connected, without any intermediate devices. The term "coupled" means either a direct connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. The term "module" means a circuit (whether integrated or otherwise), a group of such circuits, a processor(s), a processor(s) implementing software, or a combination of a circuit (whether integrated or otherwise), a group of such circuits, a processor(s) and/or a processor(s) implementing software.

Figure 1:
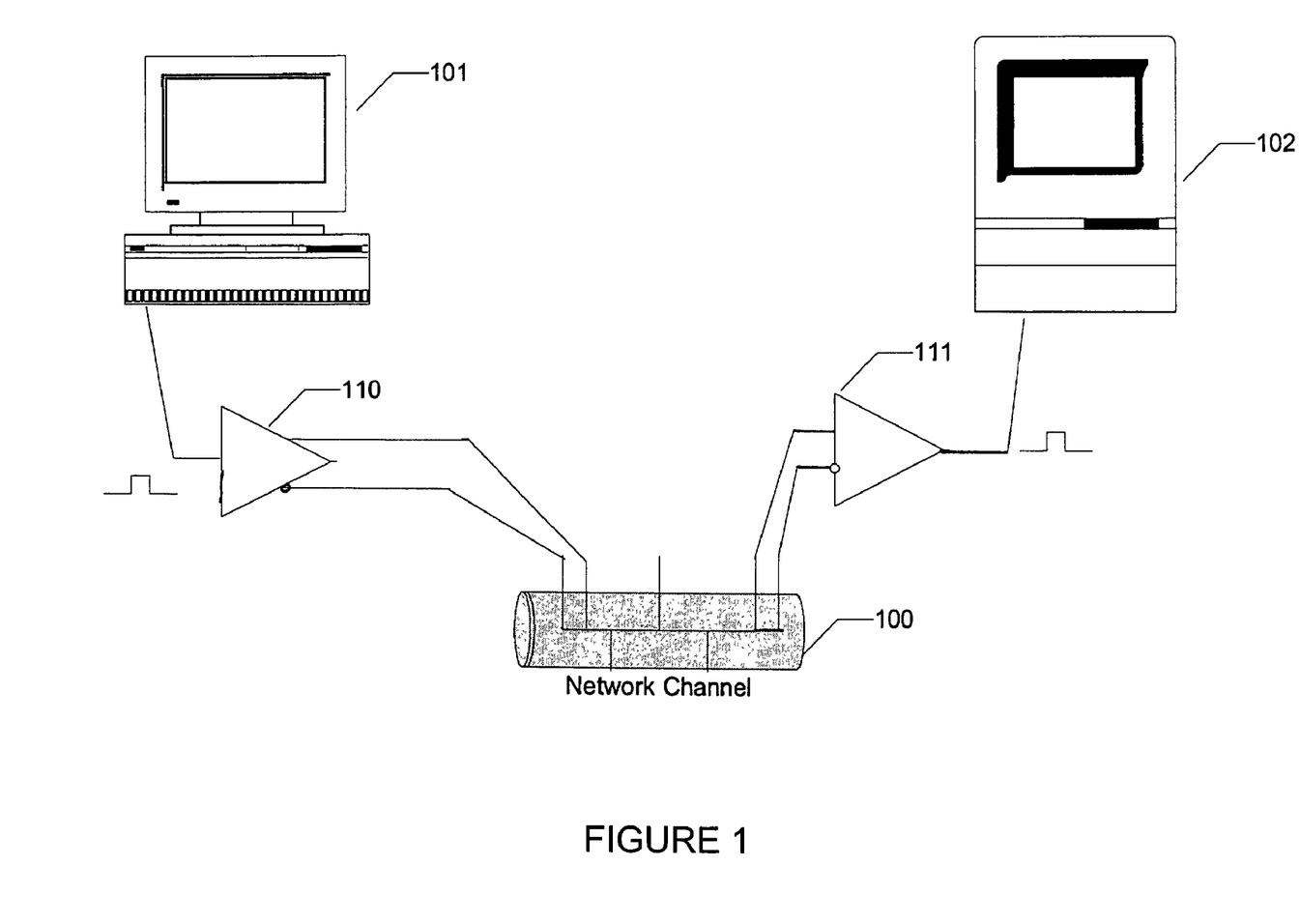
FIG. 1 illustrates an exemplary communications channel between two digital processing devices according to one possible embodiment in which the invention operates.

FIG. 1 illustrates an exemplary communications channel between two digital processing devices according to one embodiment of the present invention. Digital processing devices 101 and 102, such as personal computers, communicate with each other by transmitting digital signals through communications channel 100. In one embodiment, a digital representation of the data to be transmitted is encoded and transformed into an electronic signal capable of passing through communications channel 100. The electronic signal is transmitted by transmitter 110 to receiver 111. The received electronic signal, which may be distorted with respect to the electronic signal transmitted into or onto the channel by transmitter 110, is processed and decoded by receiver 111 to reconstruct a digital representation of the transmitted information.

The communications channel 100 may be, for example, constructed using one or more cables, wires, traces or the like, or may be part of a backplane, or may be a wireless communications medium through which the signal passes from transmitter 110 to receiver 111. One skilled in the art will recognize that any such communications media, when used in conjunction with a corresponding transmitter/receiver pair appropriate for a particular medium, may be used to construct a communications channel in accordance with the present invention. For example, other channels that may be implemented in the present invention include electronic, optical or wireless. Indeed, all types of channels of communication (i.e., communication channels), whether now known or later developed, are intended to be within the scope of the present invention.

Figure 2:
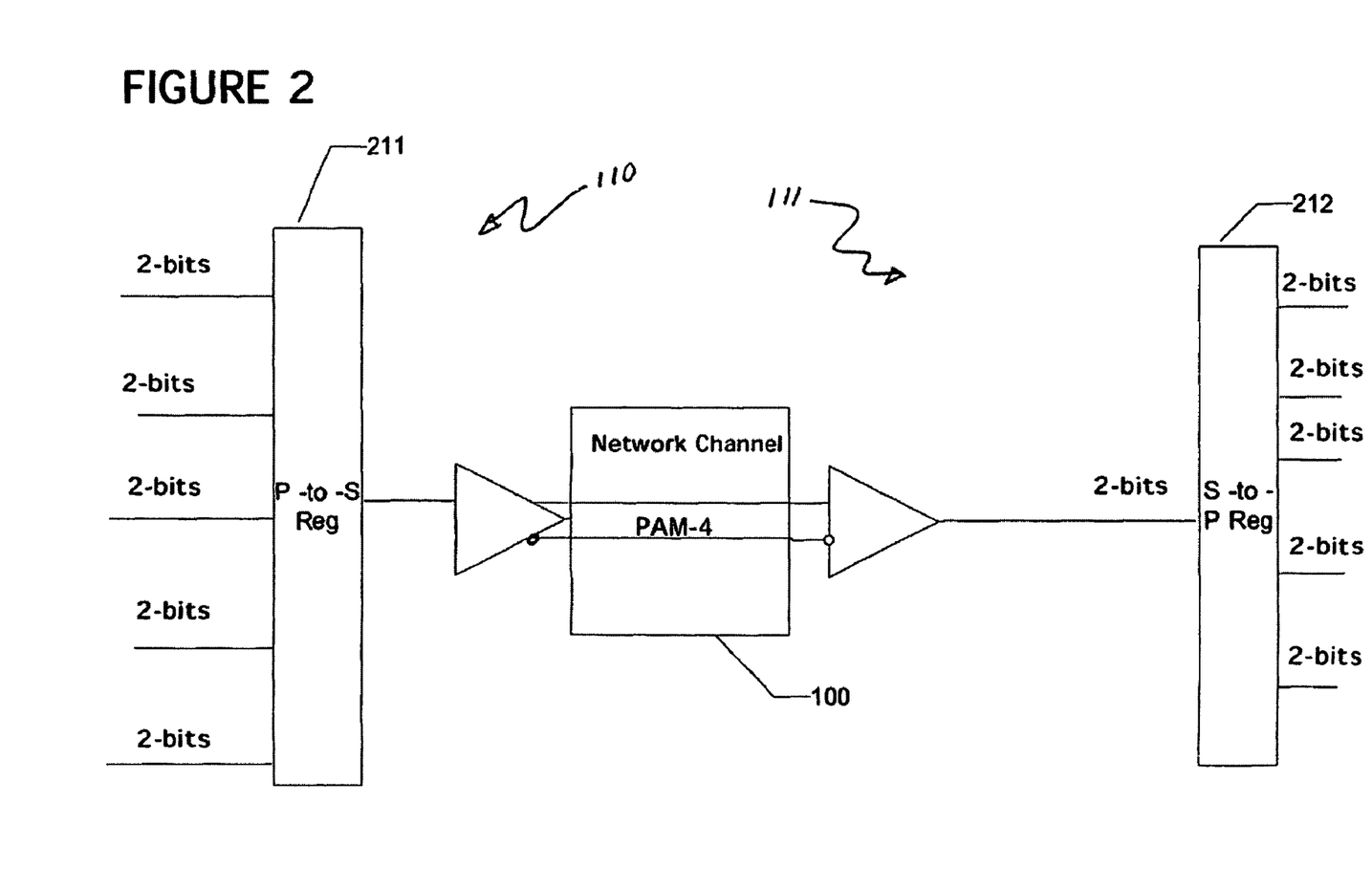
FIG. 2 illustrates an exemplary communications channel according to an embodiment of the present invention.

FIG. 2 illustrates an exemplary communications channel according to one embodiment of the present invention. The communications channel 100 enables or facilitates transmission of information between associated pairs of transmitters and receivers, for example, transmitter 110 and receiver 111. In one embodiment, transmitter 110 and receiver 111 employ a four level pulse amplitude modulated (PAM-4) communications technique to send two bits of data through channel 100. That is, the transmitter/receiver pair is used to send two bits of data for each symbol transmitted through the channel 100. A ten bit word is loaded into parallel-to-serial register 211 with the output of the register being a two bit pair that is transmitted through channel 100. Once received, the sequence of two bit codes are loaded into serial-to-parallel register 212 to reconstruct or decode the ten bit word.

The system employs a plurality of transmitter and receiver pairs, each transmitter and receiver pair using a PAM-4 communication scheme to send the two bits of data through channel 100. Moreover, each transmitter and receiver pair operates in the same manner to send data through channel 100 in a serial fashion that "packages" two bits into one single symbol. Five successive symbols are used to send the ten bit coded representation of the underlying, sparsely populated, nine bit user data byte. The overhead associated with mapping the sparsely populated nine bit user data to ten bits is typically utilized to ensure adequate timing information within the transmitted data and to control the Running Digital Sum (RDS) of the transmitted data stream.

Briefly, the RDS may be characterized as the digital integration of the transmitted symbols. A purpose of RDS control is to reduce the low frequency content of the transmitted signal, thereby widening the spectral null at DC. A common example is 8B10B encoding.

Although the present invention is described in the context of PAM-4 communications technique, the present invention may utilize other modulation formats that encode fewer or more bits per symbol codes based on other than byte wide user may be readily adapted or employed. Moreover, as mentioned above, other communication mechanisms that use different encoding tables, other than four levels, or use other modulation mechanisms may also be used. For example, 8B10B, PAM-5, PAM-8, PAM-16, CAP, and wavelet modulation may be utilized in the present invention. The techniques described herein are applicable to any and all modulation schemes, including but not limited to PAM-4 encoding described herein. Indeed, all types of modulation formats and modulation or encoding schemes, whether now known or later developed, are intended to be within the scope of the present invention.

Figure 3:
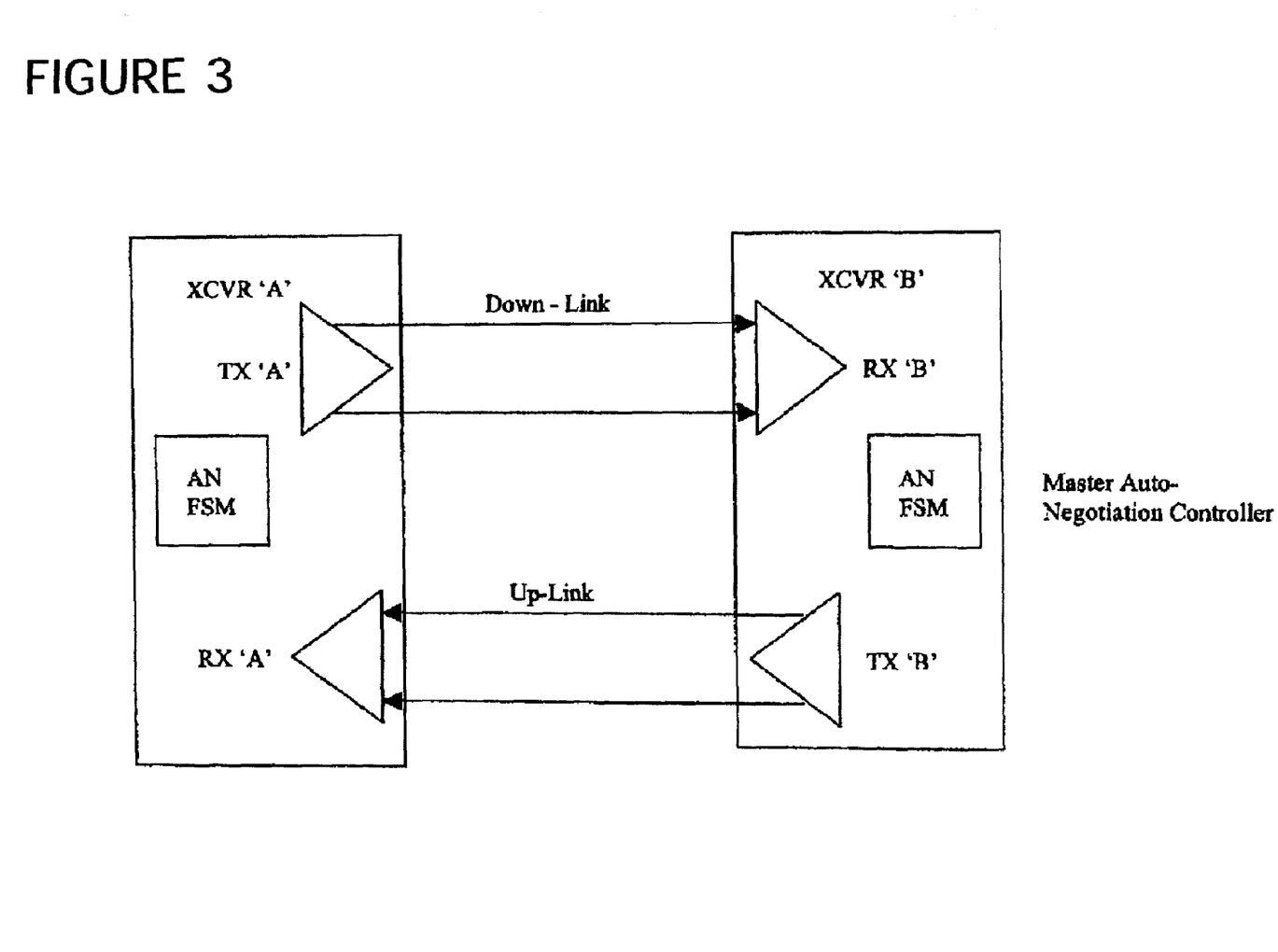
FIG. 3 illustrates a block diagram of a channel/subchannel subsystem according to an example embodiment of the present invention.

FIG. 3 illustrates one possible point-to-point network topology according to one embodiment of the present invention. In this embodiment, the communications system comprises a pair of transceivers (i.e., XCVR 'A' and XCVR 'B') connected in a point-to-point fashion, transmitting and receiving coded data, with each transmitter (i.e., TX 'A' and TX 'B') including an adaptive transmit equalizer. Here, the system employs two modes of operation including (1) Normal Operation and (2) Initialization Phase. In the Normal Operation, the system uses the communication channel to transmit and receive user data.

In the Initialization Phase, no user data is being transmitted; rather, the system uses the communication channel to set-up, initialize, or re-initialize various aspects, components or modules of the system, for example, the adaptive equalizer in the transmitter. The Initialization Phase may occur, for example, during power-up or during a REACQ (re-acquire) command. In response, a transceiver system acquires and retains control of the channel thereby prohibiting user data from being sent. During this time the transceivers may use an Auto-Negotiation (AN) protocol to transfer, for example, coefficient information for use by the transmit equalizer. This information is determined or calculated by a receiver module (for example, RX 'B') and sent to its associated transmitter module (TX 'A') that contains the adaptive transmitter equalizer. At the conclusion of the Initialization Phase, Normal Operation commences and control of the channel is released (user data transmission may commence).

It should be noted that the Auto-Negotiation protocol is described in detail in U.S. Provisional Patent Application Ser. No. 60/313,454, entitled "Transceiver System for High Speed Digital Signaling", filed Aug. 20, 2001 and non-provisional patent application entitled "System and Method for High Speed Digital Signaling", filed Aug. 16, 2002 with U.S. patent application Ser. No. 10/222,122. As mentioned above, these applications are incorporated herein by reference in their entirety.

It should be further noted that, during Normal Operation, changes in the channel characteristics or transmission characteristics of the data, caused, for example, by temperature changes, may affect the optimum value of the coefficients in the adaptive transmit equalizers. Under these circumstances, new coefficient data is determined by and sent from the receiver module to the adaptive equalizer module in the associated transmitter module during normal operation to permit "slow" adaption of coefficients without interrupting the transmission of user data. The "overlaid" control channel is also referred to as a back channel.

The revised or new coefficient data (including data pertaining to the roving tap(s), if any) may be continuously, periodically or intermittently determined or calculated by the receiver module. Similarly, the revised or new coefficient data (including data pertaining to the roving tap(s), if any) may be continuously, periodically or intermittently transmitted to the associated transmitter module. For example, with reference to FIG. 3, receiver module RX 'B' may continuously determine or calculate new coefficient data for the adaptive transmit equalizer in transceiver 'A' (i.e., XCVR 'A') due to changes in the transmission environment of, for example, the communications channel. In response, the transmitter TX 'B' of transceiver 'B' (i.e., XCVR 'B') may continuously, periodically or intermittently transmit that information via the back channel to the receiver RX 'A' of transceiver 'B'. The new coefficient data is then implemented in the adaptive equalizer to enhance the overall operation of the communications system.

In particular, with reference to FIG. 3, RX 'B' may determine that TX 'A' is no longer operating optimally, efficiently or adequately. In response, RX 'B' instructs TX 'A' on how to transmit information across the link to RX 'B', under the current operating conditions or environment, such that some cost function of error is minimized. In one embodiment, the information from RX 'B' is carried back to TX 'A' by first transferring the information to TX 'B' via an internal connection within the die (of the integrated circuit device) that constitutes XCVR 'B'. In response, XCVR 'B' encodes the message and places it into the back channel. The back channel is sent with the user data in the up-link from TX 'B' to RX 'A'. Finally, the message contained within the back channel of the up-link is decoded by digital hardware in RX 'A' and provided to digital hardware that controls the adaptive equalizer in TX 'A'. The digital hardware in TX 'A' adopts the corrections or implements the new operating parameters (for example, adaptive equalizer tap adjustments) that were contained in the back channel message by changing the settings of the adaptive equalizer in TX 'A'. This completes the feedback path from RX 'B' to TX 'A'.

Similarly, a connection from RX 'A' to TX 'B' is formed via the back channel in the other link. That is, XCVR 'A' encodes the message and places it into the back channel. That message is received and decoded by RX 'B' and provided to digital hardware that controls the adaptive equalizer in TX 'B'. TX 'B' incorporates the corrections or implements the new operating parameters by changing the settings of its adaptive equalizer.

It should be noted that other physical connections for the back channel may also be used—such as a shelf software loop which can interrogate both XCVR 'B' and XCVR 'A'. The back channel may also be implemented using a physically separate route from receiver to transmitter (either within the same media carrying the information from the transmitter to receiver, or through any other pathway including a software link that can be running above the current protocol), or as is the case in this invention, be placed within the bi-directional data-path that already exists. The present embodiment utilizes the existing bi-directional user paths to form the back channel and does so without impact to, or serious degradation of the user data bandwidth. In this regard, in one aspect, the present invention details how the back channel information is encoded and decoded without interrupting, or seriously degrading the user data flow.

In another aspect, the present invention describes a system and method of using block codes, with RDS control, to transmit additional data from the receiver module to the far-end transmitter module. In RDS control systems, there exist user data word for which there are multiple coded representations with differing weights (sum of the coded representations), the choice of which coded representation to transmit is based upon driving the RDS to zero. For example, if a user data word that is to be transmitted has two coded representations, one with a positive weight and one with a negative weight and the present value of the RDS is positive, then the encoder selects the negative weight coded representation to be transmitted. If the present value of the RDS is negative, then the encoder selects the positive weight coded representation to be transmitted. The receiver, upon receiving either of these coded representations, maps the received information back into the user data word.

In one embodiment of this aspect of the present invention, one or more user blocks are designated as special user blocks; all special user blocks having multiple coded representations. When a special user block is the input to the encoder, the state of the RDS is not used to select which code word to transmit. Instead, selection is based upon the state of the back channel information to be transmitted. For example, if a special user block has two coded representations, then it can be used to transmit one bit of back channel information.

It may be advantageous to choose a special user code so that the back channel data frame transmission occurs on average with some frequency of R codes per second. In this way, the resulting back channel bit rate (in the case of a one user code to two back channel codes) on average will be R bits per second (bps). In a more general case of one user code to n back channel codes, the resultant back channel rate will be R times $\log(n)/\log(2)$ bps. It should be noted that if there is no way to guarantee (with a high degree of certainty) that a special user block word will occur at some rate R, then it may be possible to statistically construct such a case by employing a scrambler. In this regard, the scrambler is used to scramble the user data words. Thus, even if a single user data word is repeatedly input to the system, the output of the scrambler will "utilize" or "walk through" the entire code space.

One embodiment of the present invention is to encode a subset of the user data words into two coded representations and the complement of the user data words into single coded representations. A subset of the user data words with two coded representations are designated as special user data words. In the simplest form, only one special user data word is designated.

A ROM, EPROM, EEPROM (or the like) may be used to hold or maintain the encoding table. In one embodiment, the ROM has two columns and as many rows as there are unique user data words (for eight bit user data words there would be two hundred fifty-six rows). Each row of the ROM contains the coded representations for a particular user data word and the weights of the coded representations. The weights stored as two's complement numbers. The user data word is first input to a scrambler, and the output of the scrambler forms the input to the encoding table. If the scrambled user data word has only a single coded representation, then that coded representation is stored in both columns. The selection of which column of the ROM to use is controlled by a multiplexer ("MUX") that has two inputs: the sign of the RDS and the next back channel bit to be sent.

Preceding the ROM, the user data word is delayed through a single stage, which may be realized by a bank of flip-flops, and is checked to determine if it is a special user data word. If it is a special user data word, the MUX is configured to select the back channel bit as its output, and the register holding the back channel bit is loaded with the next bit to be sent. If the scrambled user data word is not a special user data word, then the MUX is configured to select the sign of the RDS as its output. The weight of the transmitted coded representation, as a two's complement number, is added to the RDS accumulator.

In the preferred embodiment, the RDS accumulator is a saturating up/down counter, for example, an eight bit saturating up/down counter. In the receiver, when one of the coded representations of a special user block is received, it is mapped to the scrambled user data word and the back channel bit is extracted. The output of the decoding table is passed through a complementary descrambler to recover the unscrambled user data word.

In a preferred embodiment, the left hand column of the ROM corresponds to a "0" for the back channel bit and the right hand column of the ROM corresponds to a "1" for the back channel bit. In one embodiment, the back channel bits are part of a back channel frame and the receiver loads the received bit into the next position in the frame. The frame contains pieces that indicate the tap adjustment commands for each tap of the equalizer. When an entire frame is constructed it is checked for validity. If valid, the tap adjustments embedded in the frame are passed across a digital bus to the digital hardware that controls the adaptive transmit equalizer. The digital hardware receives the commands and makes the adjustments to the taps of the adaptive transmit equalizer.

Figure 4:
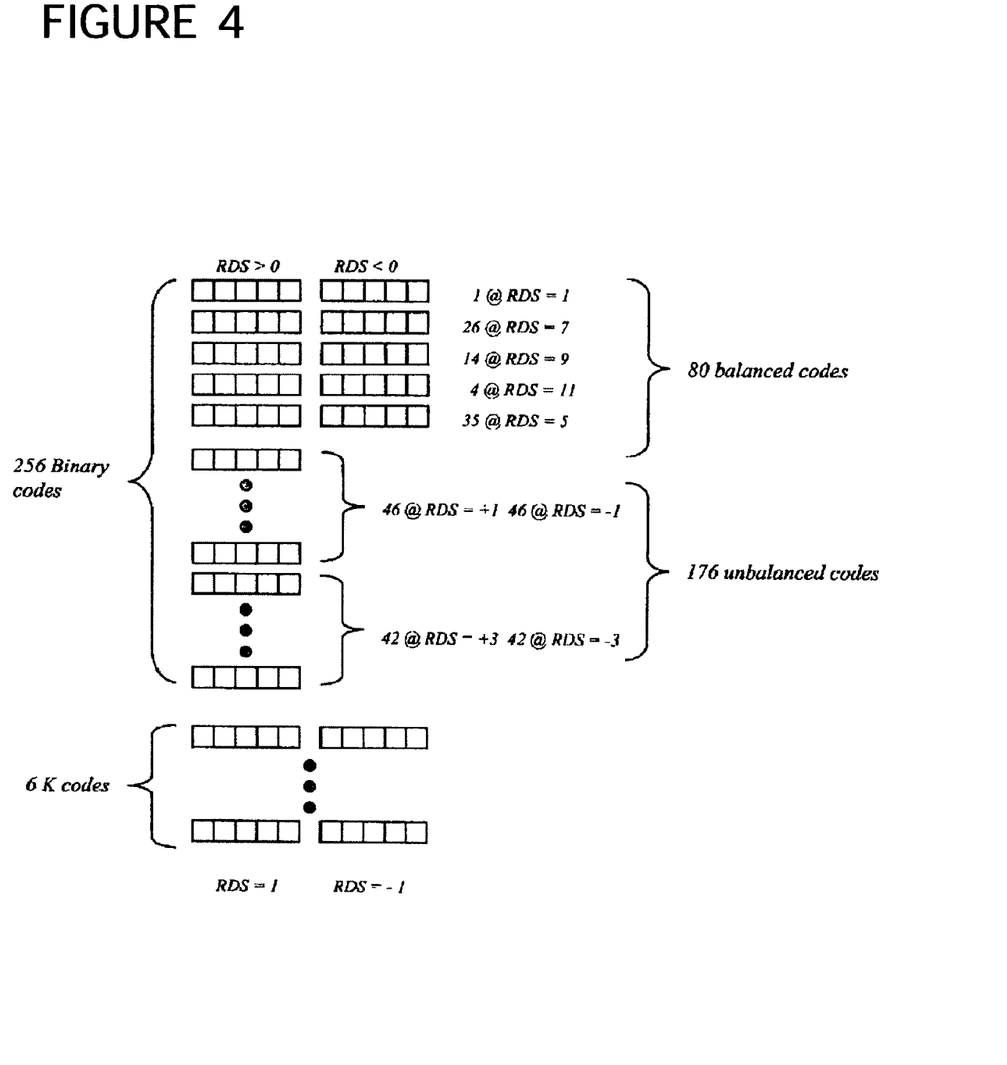
FIG. 4 illustrates an example arrangement for RDS block codes according to an embodiment of the present invention.

FIG. 4 illustrates a preferred embodiment of the proposed encoding in which the special back channel code is the one dual code with RDS=1. As can be seen from FIG. 4, there are a total of 256+6=262 user code words. A purpose of the scrambler is to arrange for a pseudo random selection of the 262 valid user codes based upon the incoming user code. By doing this, if the user code rate is U codes per second, and the pseudo random scrambler is evenly weighted, then each code word, including the special back channel code, will occur with a statistical regularity of U/262 codes per second. With the special back channel code now occurring with a rate of U/262 codes per second on average, the back channel will have a bit rate of U*log(n)/262/log(2) bits per second. Finally, for the embodiment depicted in FIG. 4, n=2 and the back channel bit rate will be U/262 bps.

Thus, in this embodiment, the resultant data rate for the back channel is variable and may be suitable for slow adaption control of the data communications channel. In addition, the use of embedding the back channel within the coding table does not interrupt, limit or impair the transmission of user data. In fact, the use of this sub-channel for control data may be completely transparent to the user.

It should be noted that other methods to include a back channel within the code space are possible, and include but are not limited to: Zero RDS Selection and Running RDS Selection. For example, Zero RDS Selection is applicable in code spaces in which it is possible to have zero weight coded representations, for example, 8B10 B. The special user data words are assigned two zero weight coded representations. One coded representation is assigned to a back channel bit of '0' while the other is assigned to a back channel bit of "1". Whenever a special user data words, mapped in this way, is encountered during transmission, a back channel bit can be sent. The receiver decodes both coded representations as the same user data word and also decodes the corresponding back channel bit. Note that in general, not all codes have a zero RDS, so the receiver may only perform this back channel decode when a zero weight coded representation is received.

In a Running RDS selection, not all block code combinations have zero RDS block words. Typically, for an m-to-k block code, if k is odd, the resulting blocks can only have non-zero RDS values, i.e., 8B5Q code which maps eight binary bits into five quaternary symbols. Here the weights of the coded representations is:

15, 13, 11, 9, 7, 5, 3, 1, −1, −3, −5, −7, −9, −11, −15.

In this case, user data words may be paired in balanced coded representations (i.e., one coded representation with RDS=+1 and one coded representation with RDS=−1). Once coded representations have been assigned, the transmitter controls the DC content of the line by keeping a running sum of the transmitted block RDS values and selecting from either the positive or negative columns in order to drive the transmitted RDS towards zero. Thus, whenever the transmitted RDS hits zero, the user is free to select the next block code's RDS. The back channel bit is encoded into this selection (i.e., if the RDS=+1 then the back channel bit=1, and if the RDS=−1 then the back channel=0).

This method requires that the running digital sum at both the transmitter and receiver be synchronized and remain synchronized (or be re-synchronized, for example, periodically or intermittently). At the receiver module, a running digital sum is computed. Whenever the sum hits "0", the RDS of the next received code word contains the encoded back channel bit. Here the probability may be more complicated and dependent upon the code space and the maximum values of the block RDS values.

Finally, TABLE 1 is a code table that may be employed in the present invention. The weights of the coded representations are not indicated below; rather the weights are the sum of the symbols of the coded representations. TABLE 1 is simply one possible implementation of a plethora of possible implementations.

TABLE 1

8B5QSMB Code Assignment

| Decimal Code | Q Code RDS > 0 | Q Code RDS < 0 | Decimal Code | Q Code RDS > 0 | Q Code RDS < 0 | Decimal Code | Q Code RDS > 0 | Q Code RDS < 0 |
|---|---|---|---|---|---|---|---|---|
| Back Channel Code | | | 85 | −3−1 3 1 1 | | 171 | −1−1 1 3 1 | |
| 1 | −3−1 1 3 1 | 3 1−1−3−1 | 86 | −3 1 1 1 1 | | 172 | 1−3 1 3 1 | |
| RDS Balancing Codes | | | 87 | | 1 1 1−3−1 | 173 | −1 1−1 3 1 | |
| 2 | −1 1 3 3 1 | 1−1−3−3−1 | 88 | | −1 3 1−3−1 | 174 | 1−1−1 3 1 | |
| 3 | 1−1 3 3 1 | −1 1−3−3−1 | 89 | | 3 1−3−1−1 | 175 | −3 1 3 1 1 | |
| 4 | −1 3 1 3 1 | 1−3−1−3−1 | 90 | | 3−1−1−1−1 | 176 | −1−1 3 1 1 | |
| 5 | 1 1 1 3 1 | −1−1−1−3−1 | 91 | 1−3 1 1 1 | | 177 | −1 1 1 1 1 | |
| 6 | 3−1 1 3 1 | −3 1−1−3−1 | 92 | −1 1−1 1 1 | | 178 | 1−1 1 1 1 | |
| 7 | 1 3−1 3 1 | −1−3 1−3−1 | 93 | 1−1−1 1 1 | | 179 | −1 3−1 1 1 | |
| 8 | 3 1−1 3 1 | −3 1 1−3−1 | 94 | 1 1−3 1 1 | | 180 | 1 1−1 1 1 | |
| 9 | −1 3 3 1 1 | 1−3−3−1−1 | 95 | 3−1−3 1 1 | | 181 | 3−1−1 1 1 | |
| 10 | 1 1 3 1 1 | −1−1−3−1−1 | 96 | −3 1 3−1 1 | | 182 | 3 1−3 1 1 | |
| 11 | 3−1 3 1 1 | −3 1−3−1−1 | 97 | −1−1 3−1 1 | | 183 | −1 1 3−1 1 | |
| 12 | 1 3 1 1 1 | −1−3−1−1−1 | 98 | | −1−3−1−1−1 | 184 | 1−1 3−1 1 | |
| 13 | 3 1 1 1 1 | −3−1−1−1−1 | 99 | | 1−1 1−1−1 | 185 | −1 3 1−1 1 | |
| 14 | 3 3−1 1 1 | −3−3 1−1−1 | 100 | | −1 1 1−1−1 | 186 | 1 1 1−1 1 | |
| 15 | 1 3 3−1 1 | −1−3−3 1−1 | 101 | | −1−1 3−1−1 | 187 | 3−1 1−1 1 | |
| 16 | 3 1 3−1 1 | −3−1−3 1−1 | 102 | | −3 1 3−1−1 | 188 | 1 3−1−1 1 | |
| 17 | 3 3 1−1 1 | −3−3−1 1−1 | 103 | | 3−1−3 1−1 | 189 | 3 1−1−1 1 | |
| 18 | −1 3 3 3−1 | 1−3−3−3 1 | 104 | | 1 1−3 1−1 | 190 | 1 3 1−3 1 | |
| 19 | 1 1 3 3−1 | −1−1−3−3 1 | 105 | −1 3−1−1 1 | | 191 | 3 1 1−3 1 | |
| 20 | 3−1 3 3−1 | −3 1−3−3 1 | 106 | | 1−3 1 1−1 | 192 | 3 3−1−3 1 | |
| 21 | 1 3 1 3−1 | −1−3−1−3 1 | 107 | 3−1−1−1 1 | | 193 | −3 1 3 3−1 | |
| 22 | 3 1 1 3−1 | −3−1−1−3 1 | 108 | 3 1−3 1 1 | | 194 | −1−1 3 3−1 | |
| 23 | 3 3−1 3−1 | −3−3 1−3 1 | 109 | −1 3 1−3 1 | | 195 | −1 1 1 3−1 | |
| 24 | 1 3 3 1−1 | −1−3−3−1 1 | 110 | 1 1 1−3 1 | | 196 | 1−1 1 3−1 | |
| 25 | 3 1 3 1−1 | −3−1−3−1 1 | 111 | 3−1 1−3 1 | | 197 | −1 3−1 3−1 | |
| 26 | 3 3 1 1−1 | −3−3−1−1 1 | 112 | 1 3−1−3 1 | | 198 | 1 1−1 3−1 | |
| 27 | 3 3 3−1−1 | −3−3−3 1 1 | 113 | 3 1−1−3 1 | | 199 | 3−1−1 3−1 | |
| 28 | −1 3 3 3 1 | 1−3−3−3−1 | 114 | −3−1 3 3−1 | | 200 | −1 1 3 1−1 | |
| 29 | 1 1 3 3 1 | −1−1−3−3−1 | 115 | −3 1 1 3−1 | | 201 | 1−1 3 1−1 | |
| 30 | 3−1 3 3 1 | −3 1−3−3−1 | 116 | −1−1 1 3−1 | | 202 | −1 3 1 1−1 | |
| 31 | 1 3 1 3 1 | −1−3−1−3−1 | 117 | 1−3 1 3−1 | | 203 | 1 1 1 1−1 | |
| 32 | 3 1 1 3 1 | −3−1−1−3−1 | 118 | −1 1−1 3−1 | | 204 | 3−1 1 1−1 | |
| 33 | 3 3−1 3 1 | −3−3 1−3−1 | 119 | 1−1−1 3−1 | | 205 | 1 3−1 1−1 | |
| 34 | 1 3 3 1 1 | −1−3−3−1−1 | 120 | −3 1 3 1−1 | | 206 | | 3 1−3−3−1 |
| 35 | 3 1 3 1 1 | −3−1−3−1−1 | 121 | −1−1 1 3 1 | | 207 | | 3−1−1−3−1 |
| 36 | 3 3 1 1 1 | −3−3−1−1−1 | 122 | −1 1 1 1−1 | | 208 | | 1 1−1−3−1 |
| 37 | 3 3 3−1 1 | −3−3−3 1−1 | 123 | 1−1 1 1−1 | | 209 | | −1 3−1−3−1 |
| 38 | 1 3 3 3−1 | −1−3−3−3 1 | 124 | −1 3−1 1−1 | | 210 | | 1−1 1−3−1 |
| 39 | 3 1 3 3−1 | −3−1−3−3 1 | 125 | 1 1−1 1−1 | | 211 | | −1 1 1−3−1 |
| 40 | 3 3 1 3−1 | −3−3−1−3 1 | 126 | 3−1−1 1−1 | | 212 | | 3−1−3−1 |
| 41 | 3 3 3 1−1 | −3−3−3−1 1 | 127 | 3 1−3 1−1 | | 213 | | 1 1−3−1 |
| 42 | 1 3 3 3 1 | −1−3−3−3−1 | 128 | −1 1 3−1−1 | | 214 | | 1−1−1−1−1 |
| 43 | 3 1 3 3 1 | −3−1−3−3−1 | 129 | 1−1 3−1−1 | | 215 | | −1 1−1−1−1 |
| 44 | 3 3 1 3 1 | −3−3−1−3−1 | 130 | −1 3 1−1−1 | | 216 | | 1−3 1−1−1 |
| 45 | 3 3 3 1 1 | −3−3−3−1−1 | 131 | 1 1 1−1−1 | | 217 | | −1−1 1−1−1 |
| 46 | −3 1 3 3 1 | 3−1−3−3−1 | 132 | 3−1 1−1−1 | | 218 | | −3 1 1−1−1 |
| 47 | −1−1 3 3 1 | 1 1−3−3−1 | 133 | 1 3−1−1−1 | | 219 | | −3−1 3−1−1 |
| 48 | −1 1 1 3 1 | 1−1−1−3−1 | 134 | 3 1−1−1−1 | | 220 | | 1−1−3 1−1 |
| 49 | 1−1 1 3 1 | −1 1−1−3−1 | 135 | 1 3 1−3−1 | | 221 | | −1 1−3 1−1 |
| 50 | −1 3−1 3 1 | 1−3 1−3−1 | 136 | 3 1 1−3−1 | | 222 | | 1−3−1 1−1 |
| 51 | 1 1−1 3 1 | −1−1 1−3−1 | 137 | 3 3−3−3−1 | | 223 | | −1−1−1 1−1 |
| 52 | 3−1−1 3 1 | −3 1 1−3−1 | 138 | | −3 1 1 1−1 | 224 | | −3 1−1 1−1 |
| 53 | −1 1 3 1 1 | 1−1−3−1−1 | 139 | | −3−1 3 1−1 | 225 | | −1−3 1 1−1 |
| 54 | 1−1 3 1 1 | −1 1−3−1−1 | 140 | | 1−3 1 3−1 | 226 | | −3 1 1 1−1 |
| 55 | −1 3 1 1 1 | 1−3−1−1−1 | 141 | | −1−1−1 3−1 | 227 | | −1−3 3 3−1 |
| 56 | 3−1 1 1 1 | −3 1−1−1−1 | 142 | | −3 1−1 3−1 | 228 | | −3−1 1 3−1 |
| 57 | 1 3−1 1 1 | −1−3 1−1−1 | 143 | | −1−3 1 3−1 | 229 | | −3−3 1 3−1 |
| 58 | 3 1−1 1 1 | −3−1 1−1−1 | 144 | | −3−1 1 3−1 | 230 | | 3−1−3−3 1 |
| 59 | −1 3 3−1 1 | 1−3−3 1−1 | 145 | | 3 1−3−3 1 | 231 | | 1 1−3−3 1 |
| 60 | 1 1 3−1 1 | −1−1−3 1−1 | 146 | | 3−1−1−3 1 | 232 | | 1−1−1−3 1 |
| 61 | 3−1 3−1 1 | −3 1−3 1−1 | 147 | | 1 1−1−3 1 | 233 | | −1 1−1−3 1 |
| 62 | 1 3 1−1 1 | −1−3−1 1−1 | 148 | | −1 3−1−3 1 | 234 | | 1−3 1−3 1 |
| 63 | 3 1 1−1 1 | −3−1−1 1−1 | 149 | | 1−1 1−3 1 | 235 | | −1−1 1−3 1 |
| 64 | 3 3−1−1 1 | −3−3 1 1−1 | 150 | | −1 1 1−3 1 | 236 | | −3 1 1−3 1 |
| 65 | 3 3 3−3 1 | −3−3−3 3−1 | 151 | | 3−1−3−1 1 | 237 | | 1−3−3 1 1 |
| 66 | −1 1 3 3−1 | 1−1−3−3 1 | 152 | | 1 1−3−1 1 | 238 | | −1 1−3 1 1 |
| 67 | 1−1 3 3−1 | −1 1−3−3 1 | 153 | | 1−1−1−1 1 | 239 | | 1−3−1 1 1 |
| 68 | −1 3 1 3−1 | 1−3−1−3 1 | 154 | | −1 1−1−1 1 | 240 | | −1−1−1−1 1 |
| 69 | 1 1 1 3−1 | −1−1−1−3 1 | 155 | | 1−3 1−1 1 | 241 | | −3 1−1−1 1 |
| 70 | 3−1 1 3−1 | −3 1−1−3 1 | 156 | | −1−1 1−1 1 | 242 | | −1−3 1−1 1 |

TABLE 1-continued

8B5QSMB Code Assignment

| Decimal Code | Q Code RDS > 0 | Q Code RDS < 0 | Decimal Code | Q Code RDS > 0 | Q Code RDS < 0 | Decimal Code | Q Code RDS > 0 | Q Code RDS < 0 |
|---|---|---|---|---|---|---|---|---|
| 71 | 1 3-1 3-1 | -1-3 1-3 1 | 157 | | -3 1 1-1 1 | 243 | -1 3 3-1-1 | |
| 72 | 3 1-1 3-1 | -3-1 1-3 1 | 158 | | -3-1 3-1 1 | 244 | 1 1 3-1-1 | |
| 73 | -1 3 3 1-1 | 1-3-3-1 1 | 159 | | 1-1-3 1 1 | 245 | 3-1 3-1-1 | |
| 74 | 1 1 3 1-1 | -1-1-3-1 1 | 160 | | -1 1-3 1 1 | 246 | 1 3 1-1-1 | |
| 75 | 3-1 3 1-1 | -3 1-3-1 1 | 161 | | 1-3-1 1 1 | 247 | 3 1 1-1-1 | |
| 76 | 1 3 1 1-1 | -1-3-1-1 1 | 162 | | -1-1-1 1 1 | 248 | 3 3-1-1-1 | |
| 77 | 3 1 1 1-1 | -3-1-1-1 1 | 163 | | -3 1-1 1 1 | 249 | 3 3 1-3-1 | |
| 78 | 3 3-1 1-1 | -3-3 1-1 1 | 164 | | -1-3 1 1 1 | 250 | | 1-3-3 1 1 |
| 79 | 1 3 3-1-1 | -1-3-3 1 1 | 165 | | -3-1 1 1 1 | 251 | | -1-1-3 1 1 |
| 80 | 3 1 3-1-1 | -3-1-3 1 1 | 166 | | -1-3-1 3 1 | 252 | | -3 1-3 1 1 |
| 81 | -1-3 1 3 1 | | 167 | | -3-1-1 3 1 | 253 | | -1-3-1 1 1 |
| 82 | | 1 3-1-3-1 | 168 | | -3-3 1 3 1 | 254 | | -3-1-1 1 1 |
| 83 | -1-1-1 3 1 | | 169 | -3-1 3 3 1 | | 255 | | -3-3 1 1 1 |
| 84 | 1-3-1 3 1 | | 170 | -3 1 1 3 1 | | 256 | | -3-3-1 3 1 |

TABLE 2

Special Characters ("K" Codes) and Supported "K" Codes

Special Characters

| | | | Q4<1:0>-Q0<1:0> | |
|---|---|---|---|---|
| Code | Description | Binary Value <7:0> | Q Code RDS > 0 | Q Code RDS < 0 |
| K 28.0 | Skip (aka Idle, aka ‖R‖) | 0 0 0 1 1 1 0 0 | -3 1-1 3 1 | 3-1 1-3-1 |
| K 28.5 | Sync (aka Idle, aka ‖K‖) | 1 0 1 1 1 1 0 0 | -1-1 1 1 1 | 1 1-1-1-1 |
| K 27.7 | Start | 1 1 1 1 1 0 1 1 | -1 1 1-1 1 | 1-1-1 1-1 |
| K 29.7 | Terminate | 1 1 1 1 1 1 0 1 | 1-1 1-1 1 | -1 1-1 1-1 |
| K 30.7 | Error | 1 1 1 1 1 1 1 0 | 1 1-1-1 1 | -1-1 1 1-1 |
| | Accelerant Control Codes | | | |
| SI-K 23.7 | | 1 1 1 1 0 1 1 1 | 3 3 3 3-1 | -3-3-3-3 1 |
| Error | | 1 1 1 1 1 1 1 1 | -1-1-1-1-1 | 1 1 1 1 1 |

In one embodiment, the case of RDS balancing codes with a decimal code between two and eighty inclusive, the selection of which coded representation to send is based upon driving the RDS to zero, as is described in U.S. Provisional Patent Application Ser. No. 60/313,476, entitled "Method and Apparatus for Encoding and Decoding Digital Communications Data", filed Aug. 20,2001 and U.S. patent application entitled "Method and Apparatus for Encoding and Decoding Digital Communications Data", filed Aug. 16, 2002 with U.S. patent application Ser. No. 10/222,254.

In the case of unbalanced RDS codes with a decimal value between eighty-one and two hundred fifty-six, the single coded representation is sent regardless of RDS state. For the case of special decimal code "1", RDS state is not used for selecting which coded representation to transmit. Instead, if the current back channel state to be transmitted has a binary value of "1", then the "-3 -1 1 3 1" coded representation is transmitted. If the current back channel state to be transmitted has a binary value of "0", then the "3 1 -1 -3 -1" coded representation is transmitted.

At the receiver, upon reception of either "-3 -1 1 3 1" or "3 1 -1 -3 -1" the decimal code "1" is output to the user data stream. However, in the case of reception of coded block "-3 -1 1 3 1" a "1" is output to the back channel data stream. Finally, in the case of reception of coded block "3 1 -1 -3 -1" a "0" is output to the back channel data stream.

In one embodiment, special codes (K codes) are all mapped to balanced coded representations. Both coded representations have the same symbol magnitudes but the symbols in one representation are of opposite sign of those in the other representation. Thus, for each K code the weight of each coded representation is equal in magnitude but opposite in sign to the other. Each time a K code is to be transmitted, a single bit of the scrambler is used to select the RDS value. When the scrambler bit is "1" the positive weight coded representation is transmitted. When the scrambler bit is "0" the negative weight coded representation is transmitted. The weight of the special code is added to RDS accumulator. The K23.7 is the 8B10B Carrier Extend K code. Whenever there is a lack of data to send the channel may be idled by sending random data. This may be accomplished by simply providing any fixed pattern to the transmit user interface. This data will be scrambled and transmitted during the idle time. The back channel will be preserved since the back channel code is among the codes that will result from scrambling. Thus, optimal equalization may be maintained even if there is no input data.

FIG. 1 illustrates an example of a suitable operating environment in which the invention may be implemented. The operating environment is only one example of a suitable operating environment and is not intended to suggest any limitation as to the scope of use or functionality of the invention. Other well known computing systems, environments, and/or configurations that may be suitable for use with the invention include, but are not limited to, network equipment, backplanes, communications equipment, personal computers, server computers, hand-held or laptop devices, multiprocessor systems, microprocessor-based systems, programmable consumer electronics, network PCs, minicomputers, mainframe computers, distributed computing environments and data communication equipment that include any of the above systems or devices, and the like.

The invention may also be described in the general context of computer-executable instructions, such as program modules, executed by one or more computers or other devices. Generally, program modules include routines, programs, objects, components, and data structures that perform particular tasks or implement particular abstract data types. Typically, the functionality of the program modules may be combined or distributed. All such combinations or distributions, now known or later developed, are within the scope of the present invention.

A processing device coupled to a communications channel 100 (via transceivers) typically includes at least some form of computer readable media. Computer readable media can be any available media that can be accessed by these devices. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, BC-ROM, digital versatile disks (DVD) or other optical storage, magnetic cassettes, magnetic tape, magnetic disk storage or other magnetic storage devices, or any other medium which can be used to store the desired information and which can be accessed by processing devices.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Additionally, the embodiments described herein may be implemented (in part) as logical operations performed by programmable processing devices. The logical operations of these various embodiments of the present invention are implemented (1) as a sequence of computer implemented steps or program modules running on a computing system and/or (2) as interconnected machine modules or hardware logic within the computing system. Accordingly, the logical operations making up the embodiments of the invention described herein can be variously referred to as operations, steps, or modules.

While the above embodiments of the present invention describe a system and method for embedding a sub-channel in a block coded data stream, one skilled in the art will recognize that the use of a particular coding arrangement is merely an example embodiment of the present invention. It is to be understood that other embodiments may be utilized and operational changes may be made without departing from the scope of the present invention as recited in the attached claims.

As such, the foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto.

What is claimed is:

1. A system for providing a bi-directional data communications channel having a user data channel and a back channel within each direction of the bi-directional data communications channel, the system comprising:

at least two transmitter modules, one transmitter module for each direction of the bi-directional data communications channel, each of the transmitter modules encoding a user data stream and a back channel data stream into a coded data stream and transmitting the coded data stream through the data communications channel;

at least two receiver modules, one receiver module for each direction of the bi-directional data communications channel, each of the receiver modules receiving the coded data stream transmitted through the data communications channel and decoding the coded data stream into the user data stream and the back channel data stream; and wherein the user data stream includes at least one user data word that corresponds to a plurality of coded representations wherein each of the coded representations represents a symbol of the back channel data stream, and wherein each receiver module, upon receiving at least one of the plurality of coded representations that represents back channel information, decodes the coded representation into the user data word of the user data stream and into the symbol of the back channel data stream.

2. The system according to claim 1, wherein the back channel data is transmitted as a serial stream of symbols within a data frame.

3. The system according to claim 2, wherein the back channel data comprises channel performance information to allow continuous or periodic adaption of operation of the communications channel.

4. The system according to claim 2 where the communications channel includes a backplane.

5. The system according to claim 2 where the communications channel includes a cable.

6. The system according to claim 1, wherein a second plurality of code words that correspond to back channel information is incorporated into the coded, transmitted data stream when back channel data symbols have not been transmitted within a pre-defined amount of time to ensure a minimum back channel data rate.

7. The system according to claim 6, wherein each receiver module, upon receiving one of the plurality of code words that represents back channel information, decodes for the back channel data stream.

8. The system according to claim 1, wherein the back channel is used to establish a control channel to a far-end module of a link and wherein the back channel is controlled by a near-end module.

9. The system according to claim 1, wherein the back channel is used to provide additional channel bandwidth that may be mapped to another communications channel.

10. A method for providing a bi-directional data communications channel having a user data channel and a back channel within each direction of the bi-directional data communications channel, the method comprising:

encoding, for each direction of the bi-directional data communications channel, a user data stream and a back channel data stream into a coded data stream and transmitting the coded data stream through the communications channel, wherein the encoding is performed by at least two transmitter modules, one transmitter module for each direction of the bi-directional data communications channel; and receiving, for each direction of the bi-directional data communications channel, the coded data stream transmitted through the data channel and decoding the coded data stream into the user data stream and the back channel data stream, wherein the receiving is performed by at least two receiver modules, one receiver module for each direction of the bi-directional data communications channel;

wherein the user data stream includes at least one user data word that corresponds to a plurality of coded representations wherein each of the coded representations represents a symbol of the back channel data stream, and wherein each receiver module, upon receiving at least one of the plurality of coded representations that represents back channel information, decodes the coded representation into the user data word of the user data stream and into the symbol of the back channel data stream.

11. The method of claim 10, wherein the back channel data is transmitted as a serial stream of symbols within a data frame.

12. The method of claim 11, wherein the back channel data comprises channel performance information to allow continuous or periodic adaption of operation of the communications channel.

13. The method of claim 11 where the communications channel includes a backplane.

14. The method of claim 11 where the communications channel includes a cable.

15. The method of claim 10, further comprising:

incorporating into the coded, transmitted data stream a second plurality of code words that correspond to back channel information when back channel data symbols have not been transmitted within a pre-defined amount of time to ensure a minimum back channel data rate.

16. The method of claim 15, further comprising:

decoding for the back channel data stream, by each receiver module, upon receiving one of the plurality of code words that represents back channel information.

17. The method of claim 10, further comprising:

using the back channel to establish a control channel to a far-end module of a link, wherein the back channel is controlled by a near-end module.

18. The method of claim 10, further comprising:

using the back channel to provide additional channel bandwidth that may be mapped to another communications channel.

* * * * *